(12) United States Patent
Kim et al.

(10) Patent No.: US 11,175,525 B2
(45) Date of Patent: Nov. 16, 2021

(54) DISPLAY DEVICE

(71) Applicant: LG Display Co., Ltd., Seoul (KR)

(72) Inventors: Yeongho Kim, Paju-si (KR); Youngjin Jeong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/119,094

(22) Filed: Dec. 11, 2020

(65) Prior Publication Data

US 2021/0200014 A1 Jul. 1, 2021

(30) Foreign Application Priority Data

Dec. 30, 2019 (KR) .................. 10-2019-0178286

(51) Int. Cl.
| | |
|---|---|
| *G02F 1/1333* | (2006.01) |
| *G02F 1/13357* | (2006.01) |
| *G02F 1/1345* | (2006.01) |

(52) U.S. Cl.
CPC .... *G02F 1/133308* (2013.01); *G02F 1/13452* (2013.01); *G02F 1/133608* (2013.01); *G02F 2202/16* (2013.01)

(58) Field of Classification Search
None
See application file for complete search history.

(56) References Cited

U.S. PATENT DOCUMENTS

2013/0342495 A1* 12/2013 Rappoport ........... H05K 9/0054
345/174
2018/0157093 A1* 6/2018 Jang .................... H05K 9/0054

FOREIGN PATENT DOCUMENTS

| KR | 10-2017-0034651 A | 3/2017 |
|---|---|---|
| KR | 10-2019122 B1 | 9/2019 |

* cited by examiner

*Primary Examiner* — Phu Vu
(74) *Attorney, Agent, or Firm* — Birch, Stewart, Kolasch & Birch, LLP

(57) ABSTRACT

A display device is proposed, which includes a cover bottom in which a liquid crystal panel displaying an image and a backlight unit providing light to the liquid crystal panel are housed; a circuit board mounted on a rear surface of the cover bottom; a film electrically connecting the liquid crystal panel and the circuit board and having electronic component mounted thereon; a foam gasket assembly including a conductive fabric attached to a side surface of the cover bottom to cover the film and a conductive metal member having one side attached to the conductive fabric and the other side attached to the cover bottom; and a bracket coupled to a rear surface of the cover bottom to cover the circuit board, thereby allowing a simple structure while preventing damage to products due to static electricity.

12 Claims, 6 Drawing Sheets

DISPLAY DEVICE

CROSS REFERENCE TO RELATED APPLICATIONS

The application claims the priority benefit of Korean Patent Application No. 10-2019-0178286 filed in the Republic of Korea on Dec. 30, 2019, the entire contents of which are hereby expressly incorporated herein by reference for all purposed as if fully set forth into the present application.

BACKGROUND OF THE INVENTION

Field of the Invention

The present disclosure relates to a display device.

Description of the Related Art

A display device is a device for displaying images, such as a liquid crystal display (LCD), an organic light emitting diode display (OLED), a plasma liquid crystal panel (PDP), and the like. Among them, liquid crystal display devices capable of realizing high resolution and capable of miniaturization and enlargement are widely utilized.

Meanwhile, the liquid crystal display device includes a liquid crystal panel, a driving chip for driving the liquid crystal panel, a circuit board, and the like. When electrostatic electricity flows into the liquid crystal panel due to electrostatic discharge (ESD), pixels or driving chips constituting the liquid crystal panel can be fatally damaged, thereby causing a product failure.

Although there have been various attempts, such as providing a separate electrostatic discharge circuit, to prevent damage due to such electrostatic discharge, such attempts make a structure of the display device complicated, whereby it is disadvantageous in terms of weight, thickness, cost, and assembly performance.

Therefore, there is an increased need to development of a display device having a simple structure while being able to prevent damage to products due to static electricity.

SUMMARY OF THE INVENTION

In order to solve or address the above-described problem and other limitations associate with the related art, the present disclosure is to provide an improved display device, which has a simple structure while preventing damage to products due to static electricity.

A display device according to embodiments of the present disclosure includes a cover bottom in which a liquid crystal panel displaying an image and a backlight unit providing light to the liquid crystal panel are housed; a circuit board mounted on a rear surface of the cover bottom; a film electrically connecting the liquid crystal panel and the circuit board and having electronic component mounted thereon; a foam gasket assembly including a conductive fabric attached to a side surface of the cover bottom to cover the film and a conductive metal member having one side attached to the conductive fabric and the other side attached to the cover bottom; and a bracket coupled to a rear surface of the cover bottom to cover the circuit board.

In addition, according to embodiments of the present disclosure, static electricity generated in the display device can be energized to the cover bottom through the foam gasket assembly.

In addition, according to embodiments of the present disclosure, the cover bottom can include a side frame provided on a side surface of the backlight unit to support the liquid crystal panel, and a bottom frame on which the backlight unit is seated.

In addition, according to embodiments of the present disclosure, the film can be bent along an outer surface of the side frame.

In addition, according to embodiments of the present disclosure, a driver IC for driving the liquid crystal panel can be mounted on the film.

In addition, according to embodiments of the present disclosure, a plurality of conductive metal members can be provided to be spaced apart along a longitudinal direction of the conductive fabric.

In addition, according to embodiments of the present disclosure, the another side of the conductive metal member can be spaced apart from the circuit board.

In addition, according to embodiments of the present disclosure, one side of the conductive metal member can be interposed between the foam gasket assembly and the film.

In addition, according to embodiments of the present disclosure, a conductive adhesive layer can be applied to one surface of the conductive fabric.

In addition, according to embodiments of the present disclosure, the conductive fabric can be formed by sequentially plating or coating nickel (Ni), copper (Cu), gold (Au), and anti-pollution urethane (ATU) on a polyester fabric.

In addition, according to embodiments of the present disclosure, the display device can further include a rear cover having the cover bottom and the bracket housed therein.

The display device according to embodiments of the present disclosure has a simple structure while preventing damage to products due to static electricity.

In addition, the display device according to embodiments of the present disclosure can simplify an assembly process, thereby improving assembly performance.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF THE INVENTION

Hereinafter, various embodiments of the present disclosure will be described with reference to the accompanying drawings.

A display device to be described below is preferably a liquid crystal display device, and can be implemented in a twisted nematic (TN) mode, a vertical alignment (VA) mode, an in plane switching (IPS) mode, a fringe field switching (FFS) mode, or electrically controlled birefringence (ECB) mode according to a structure of a pixel electrode and a common electrode of a liquid crystal panel. However, the display device is not limited thereto and may be other types of displays.

In addition, a part or all of the display devices can be included in various devices, such as televisions, monitors, computers, laptops, tablet PCs, wearable displays, portable devices such as smartphones, audio/video devices, indoor and outdoor advertising displays, and vehicle displays.

Figure 1:
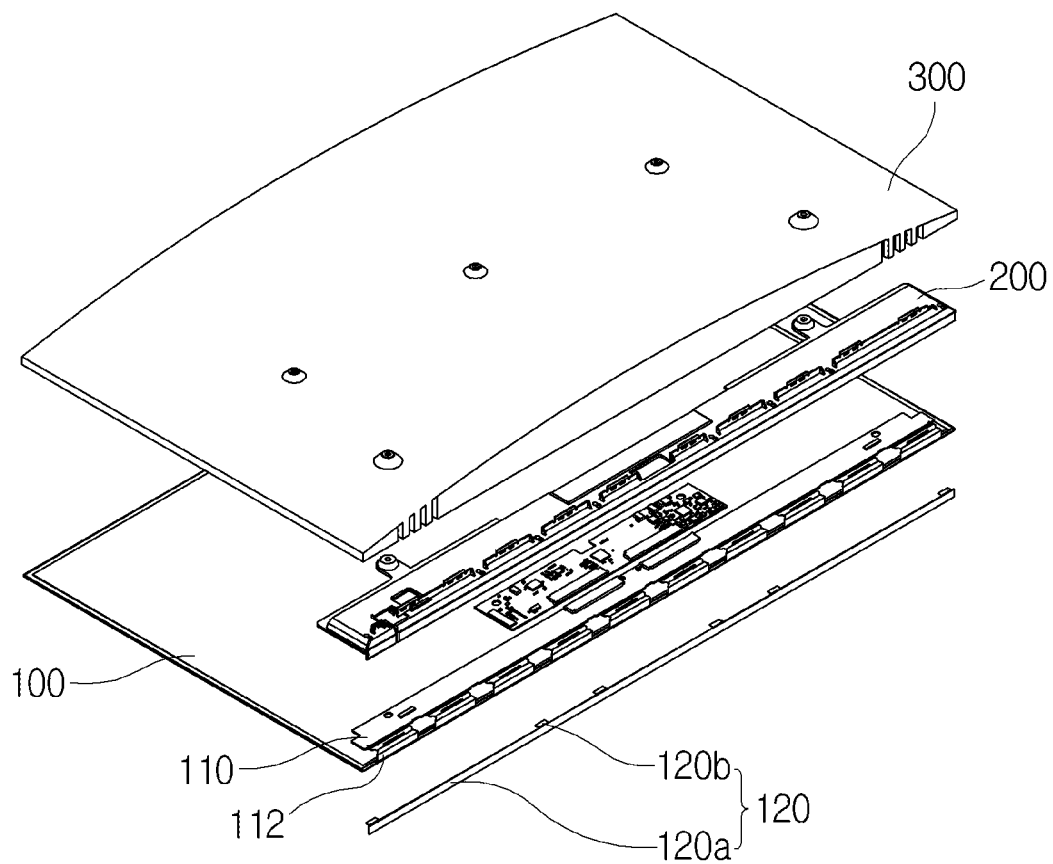
FIG. 1 is an exploded view of a display device according to an embodiment of the present disclosure.
Figure 2:
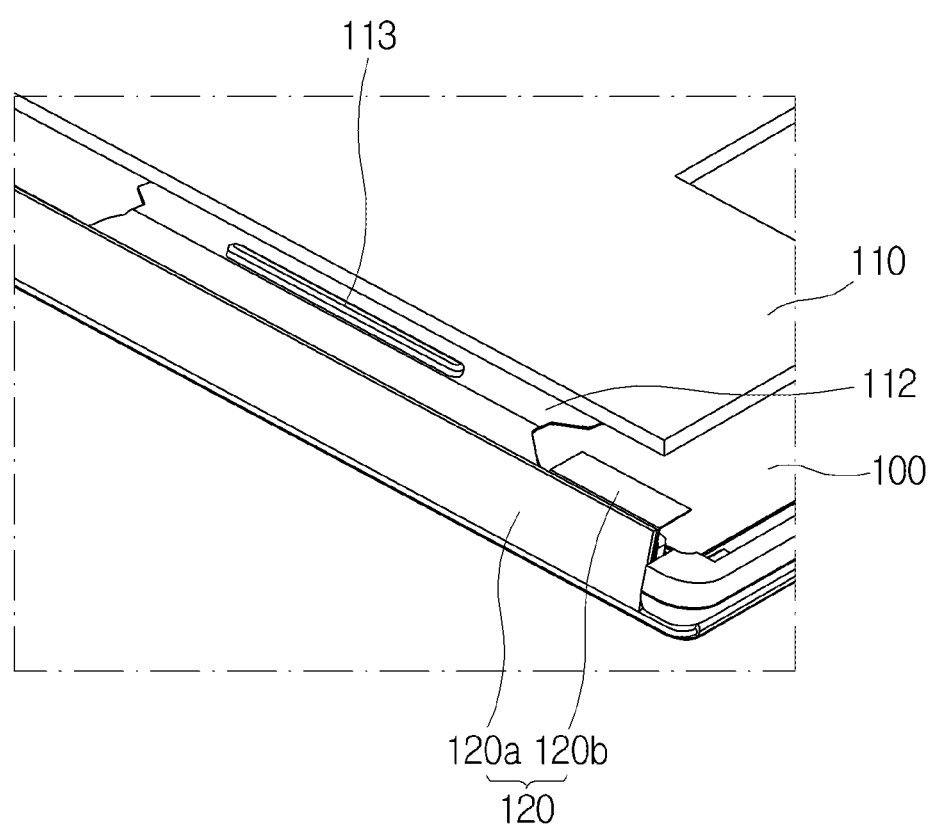
FIG. 2 is a perspective view showing one side to which a foam gasket assembly is attached in a display device according to an embodiment of the present disclosure.
Figure 3:
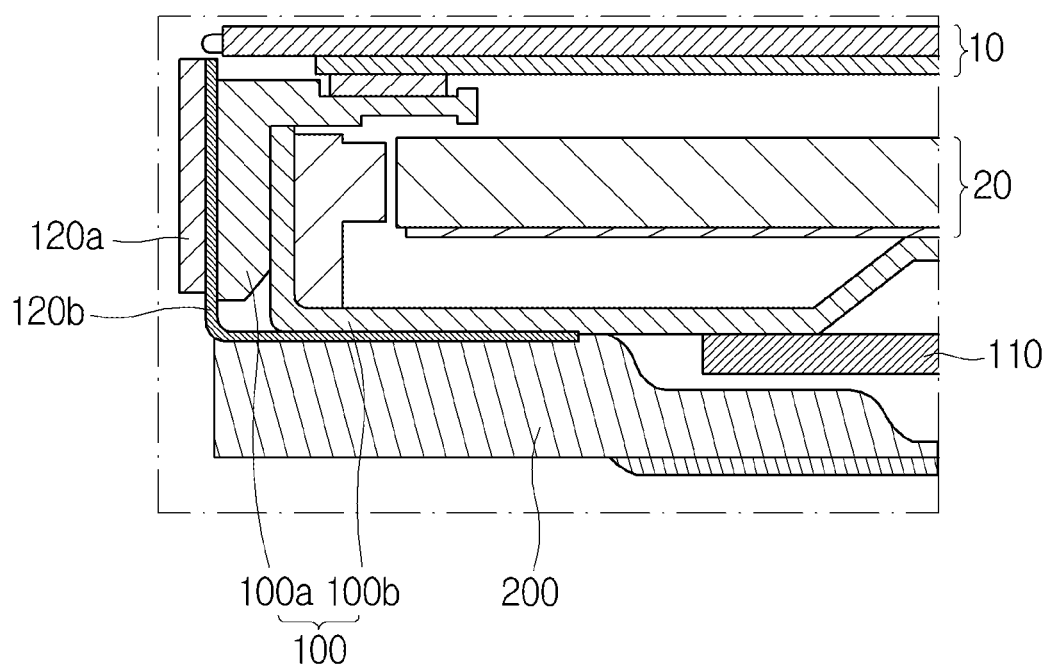
FIG. 3 is a cross-sectional view showing one side to which a foam gasket assembly is attached in a display device according to an embodiment of the present disclosure.
Figure 4:
FIG. 4 is a cross-sectional view schematically showing a cross-section of a conductive fabric in a display device according to an embodiment of the present disclosure.
Figure 5:
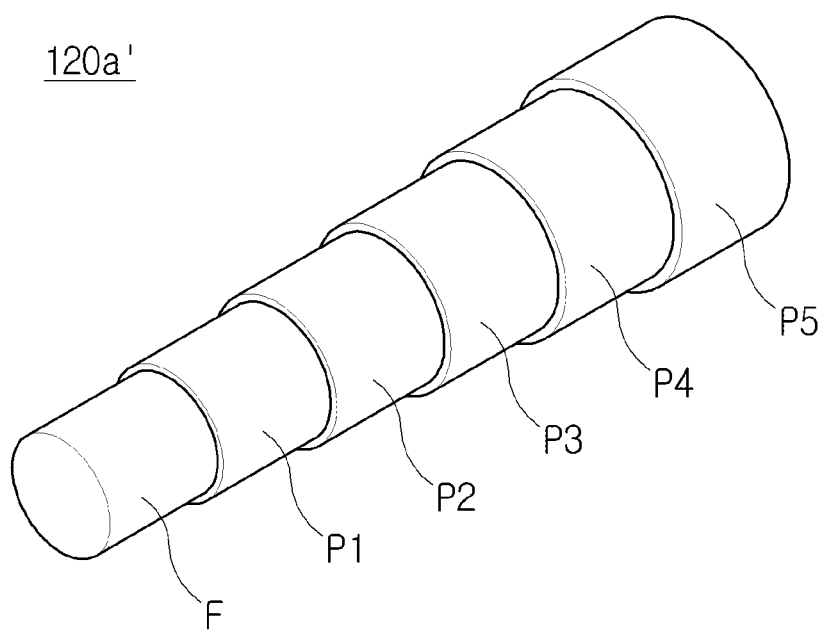
FIG. 5 is a perspective view showing a plating structure of the conductive fabric in FIG. 4.

FIG. 1 is an exploded view of a display device according to an embodiment of the present disclosure; FIG. 2 is a perspective view showing one side to which a foam gasket assembly is attached in a display device according to an embodiment of the present disclosure; FIG. 3 is a cross-sectional view showing one side to which a foam gasket assembly is attached in a display device according to an embodiment of the present disclosure; FIG. 4 is a cross-sectional view schematically showing a cross-section of a conductive fabric in a display device according to an embodiment of the present disclosure; FIG. 5 is a perspective view showing a plating structure of the conductive fabric in FIG. 4; and FIGS. 6A to 6D are perspective views sequentially showing a display device in an assembly sequence according to an embodiment of the present disclosure. All the components of the display device according to all embodiments of the present disclosure are operatively coupled and configured.

As shown in FIGS. 1 and 2, the display device according to an embodiment of the present disclosure includes a cover bottom 100 in which a liquid crystal panel 10 displaying an image and a backlight unit 20 providing light to the liquid crystal panel are housed; a circuit board 110 mounted on a rear surface of the cover bottom 100; a film 112 electrically connecting the liquid crystal panel 10 and the circuit board 110 and having electronic component mounted thereon; a foam gasket assembly 120 including a conductive fabric 120a attached to a side surface of the cover bottom 100 to cover the film 112 and a conductive metal member 120b having one side attached to the conductive fabric 120a and the other side attached to the cover bottom 100; a bracket 200 coupled to the rear surface of the cover bottom 100 to cover the circuit board 110; and a rear cover 300 in which the cover bottom 100 and the bracket 200 is accommodated.

First, the liquid crystal panel 10 and the backlight unit 20 accommodated in the cover bottom 100 will be described with reference to FIG. 3.

The liquid crystal panel 10 serves to display an image. In addition, the image can be displayed in a continuous manner. The liquid crystal panel 10 includes an upper substrate including a color filter and the like, a lower substrate including a switching transistor and the like, and a liquid crystal layer positioned between them. Polarizers are attached to front and rear surfaces of the liquid crystal panel 10.

The liquid crystal panel 10 is divided into a display area in which an image is displayed and a non-display area in which an image is not displayed. The display area is a center region of the liquid crystal panel 10, and the non-display area corresponds to a partial region proximate to an edge of the liquid crystal panel 10.

The backlight unit 20 is intended to provide light to the liquid crystal panel 10 and is located behind the liquid crystal panel 10. The backlight unit 20 includes one or more light sources, a light guide plate, a reflective sheet, an optical sheet, and the like.

The light source is provided with one or more organic light emitting diodes (LEDs), and is installed on the side surface of the light guide plate. Herein, the light source can be installed on one side surface or multiple side surfaces of the light guide plate.

The light guide plate is mounted on the reflective sheet to convert light from the light source into a surface light source. The light guide plate is formed of a transparent material. For example, the light guide plate is made of a transparent polymethyl methacrylate (PMMA) or polycarbonate (PC). A reflective pattern for scattering and reflecting light can be formed on the bottom surface of the light guide plate. Light incident from the light source to the inside of the light guide plate is scattered and reflected by a reflection pattern, and light exceeding a specific critical angle on the basis of the normal line to the top surface of the light guide plate is emitted to the optical sheet through the top surface of the light guide plate.

The reflective sheet is provided under the light guide plate and serves to reflect light. The reflective sheet is made of a material having high light reflectance. For example, the reflective sheet is made of polyethylene terephthalate (PET) or polycarbonate (PC).

The optical sheet is rested on a light guide plate and serves to collect and diffuse light emitted from the light guide plate. The optical sheet is composed of a plurality of sheets having different structures and functions from each other. For example, the optical sheet can include a prism sheet that improves luminance by condensing light emitted from the light guide plate toward the front side of the display device. In addition, the optical sheet can further include a protective sheet for protecting the prism sheet. In addition, a sheet having various functions can be further included according to luminance characteristics required in the display device.

The backlight unit 20 is mounted on the cover bottom 100. The cover bottom 100 is made of a metal material that is easy to dissipate heat. The cover bottom 100 includes a side frame 100a provided on the side surface of the backlight unit to support the liquid crystal panel and a bottom frame 100b on which the backlight unit is seated. Alternatively, the side frame 100a and the bottom frame 100b can be integrally formed.

The circuit board 110 is attached to the rear surface of the cover bottom 100. An example of the circuit board 110 includes a printed circuit board (PCB). The circuit board 110 serves to process signals received from the outside and to transmit the signals to the liquid crystal panel 10 through the film 112 to be described later. To this end, various elements are mounted on the circuit board 110.

The film 112 electrically connects the circuit board 110 and the liquid crystal panel 10. A driver integrated circuit (IC) 113 is mounted on the film 112. The driver IC 113 is an electronic component that serves to drive the liquid crystal panel 10. With this structure, a signal is transmitted from the circuit board 110 to the liquid crystal panel 10 through the film 112 and the driver IC 113, whereby an image is displayed by the signal. A plurality of films 112 can be provided in the display device, and the driver IC 113 is also mounted on each of the plurality of films 112.

The film 112 is made of a flexible conductive material that is easy to bend. For example, the film 112 can be a tape carrier package (TCP). A method in which the chips are mounted on the films is referred to a COF (Chip On Film) method. For example, the driver IC 113 can be mounted in the COF method.

In the various elements mounted on the circuit board 110, the driver IC 113 mounted on the film 112, or the liquid crystal panel 10, static electricity can be generated during operation of the display device. However, when electrostatic discharge (ESD) occurs, there is a risk that electronic components including the liquid crystal panel 10 or the driver IC can be fatally damaged.

Therefore, the display device according to the present embodiment is provided with a foam gasket assembly 120 to prevent damage due to electrostatic discharge.

The foam gasket assembly 120 includes a conductive fabric 120a covering one side of the cover bottom 100; and a conductive metal member 120b having one side attached to the inner surface of the conductive fabric 120a, a middle portion bent, and the other side attached to the back side of the cover bottom 100.

The conductive fabric 120a covers the outer surface of the film 112 and thus electrically connected to the film 112. The conductive metal member 120b is spaced apart from the film 112. Since the plurality of films 112 are provided to be spaced apart, the conductive metal member 120b is positioned, in a region where the films 112 are spaced, i.e., between neighboring films. However, the conductive fabric 120a and the conductive metal member 120b can be integrally formed.

As shown in FIG. 4, the conductive fabric 120a includes a body portion 120a' having a shape wound at least once to have a thickness t, and an adhesive layer 120a" applied to one surface of the body portion. Herein, in this example, the thickness t is 0.4 mm.

As shown in the example of FIG. 5, the body portion 120a' of the conductive fabric 120a has a structure plated or coated with a plurality of materials different from each other. Herein, the fabric F is made of a polyester having high durability, in which a first layer P1 surrounding the fabric is nickel (Ni), a second layer P2 is copper (Cu), the third layer P3 is nickel (Ni), and the fourth layer P4 is plated with gold (Au), and the fifth layer P5 is coated with anti-tarnish urethane (ATU). However, it is possible that some or all of the layers are plated or coated with different materials, as long as the layers have conductivity when being modified. The body portion of such a structure is formed in such a manner that a plurality of conductive fabric strands is inter-wound similarly to tissue of the fiber.

The conductive fabric 120a has an empty space therein and is made of a highly durable material, whereby impact from the outside can be alleviated. Therefore, the conductive fabric 120a serves to protect the driver IC 113 from shock or vibration, because the conductive fabric 120a is attached to the outer surface of the film 112.

As the conductive metal member 120b, a material having ductility can be selected from among metals. The conductive metal member 120b is bent along an edge of the cover bottom 100.

An adhesive layer can be applied to an inner surface of the conductive metal member 120b, similarly to the conductive fabric 120a. The conductive metal member 120b is spaced so as not to contact the circuit board 110.

The conductive metal member 120b is attached to the cover bottom 100. Herein, since the cover bottom 100 is also made of a metal, static electricity delivered to the conductive metal member 120b through the conductive fabric 120a is energized to the cover bottom 100.

The bracket 200 is coupled to the rear surface of the cover bottom 100. The bracket 200 is intended to protect the circuit board 110, and has a space in which the circuit board 110 is accommodated. The bracket 200 is formed in a size enough to cover a partial region where the circuit board 110 is located, rather than the entire rear surface of the cover bottom 100. The bracket 200 contacts the conductive metal member 120b.

Static electricity generated from the components mounted on the circuit board 110, the driver IC 113 mounted on the film 112, or the liquid crystal panel 10 is energized to the cover bottom 100 through the foam gasket assembly 120 electrically connected to the film 112. Specifically, static electricity is applied to the cover bottom 100 through the conductive fabric 120a and the conductive metal member 120b. Accordingly, it is possible to prevent damage to the driver IC 113, the circuit board 110, and the liquid crystal panel 10 due to electrostatic discharge ESD, thereby preventing a malfunction of the display device.

FIGS. 6A to 6D show assembly processes of a display device according to an embodiment of the present disclosure.

Figure 6A:
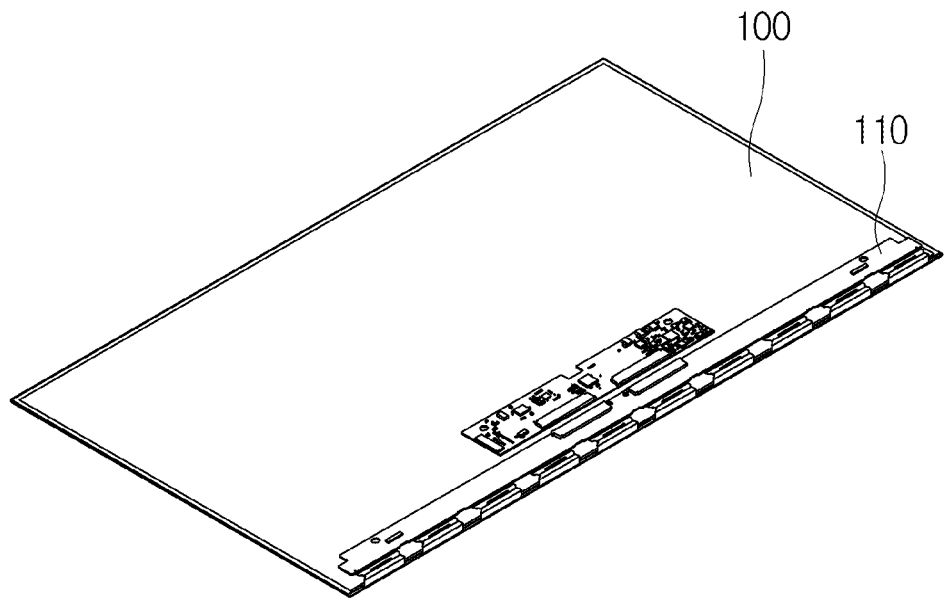
FIGS. 6A to 6D are perspective views sequentially showing a display device in an assembly sequence according to an embodiment of the present disclosure.

First, as shown in FIG. 6A, a circuit board 110 is attached to a cover bottom 100. Herein, the circuit board 110 and a liquid crystal panel 10 are electrically connected by the film 112.

Figure 6B:
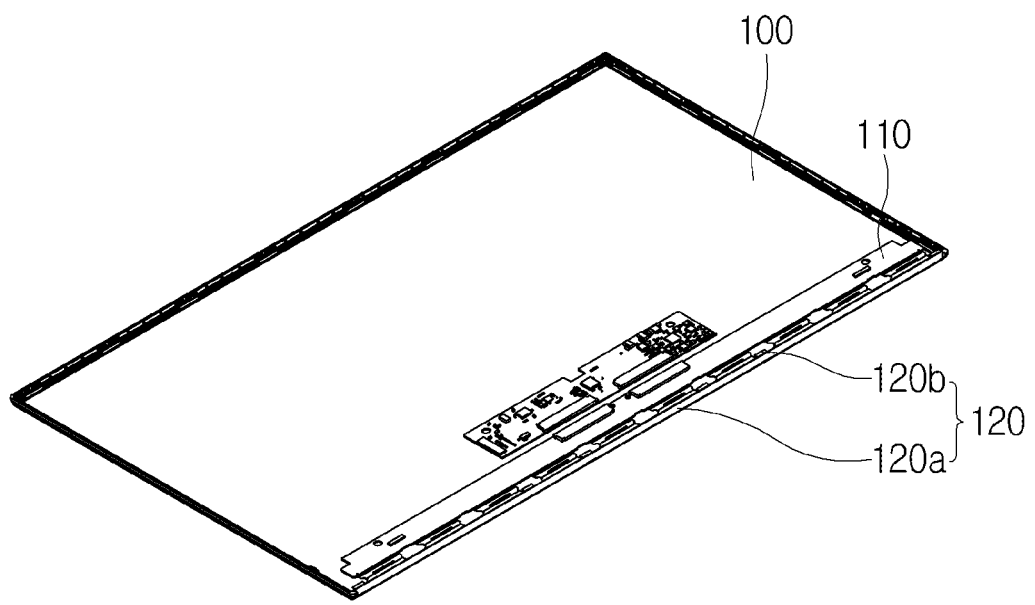

Then, as shown in FIG. 6B, the conductive fabric 120a is attached to one side of the cover bottom 100, and the conductive metal member 120b is attached to the rear surface of the cover bottom 100.

Figure 6C:
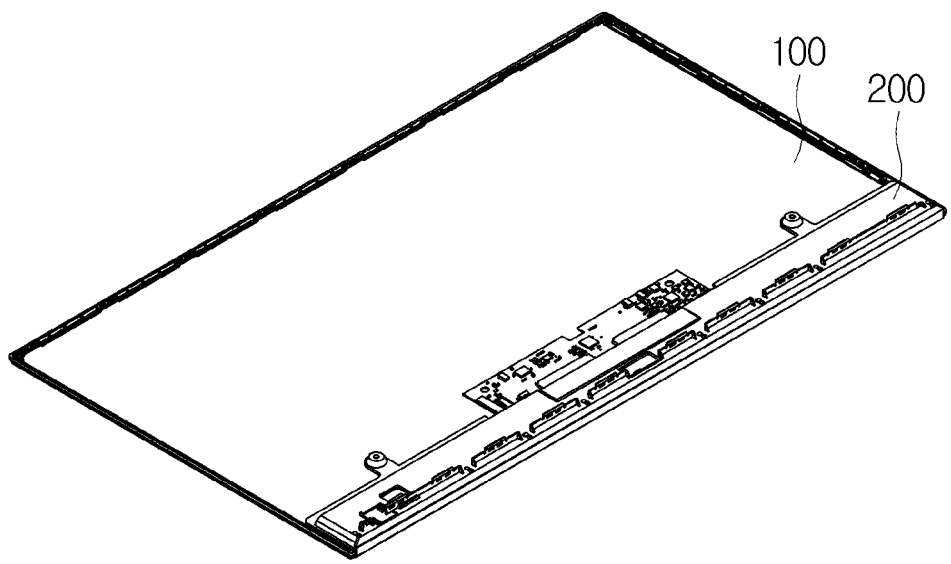

Furthermore, as shown in FIG. 6C, the bracket 200 is coupled to the rear surface of the cover bottom 100 to cover the circuit board 110. Herein, the bracket 200 is fastened to the cover bottom 100 by screw-thread engagement.

A separate cover shield is also provided inside the bracket 200 for electrostatic conduction in the related art, which results that an additional assembly process is required and thus a cost increases. Meanwhile, according to this embodiment, the cover shield is deleted so that the assembly process is simplified and the structure is simplified.

Figure 6D:
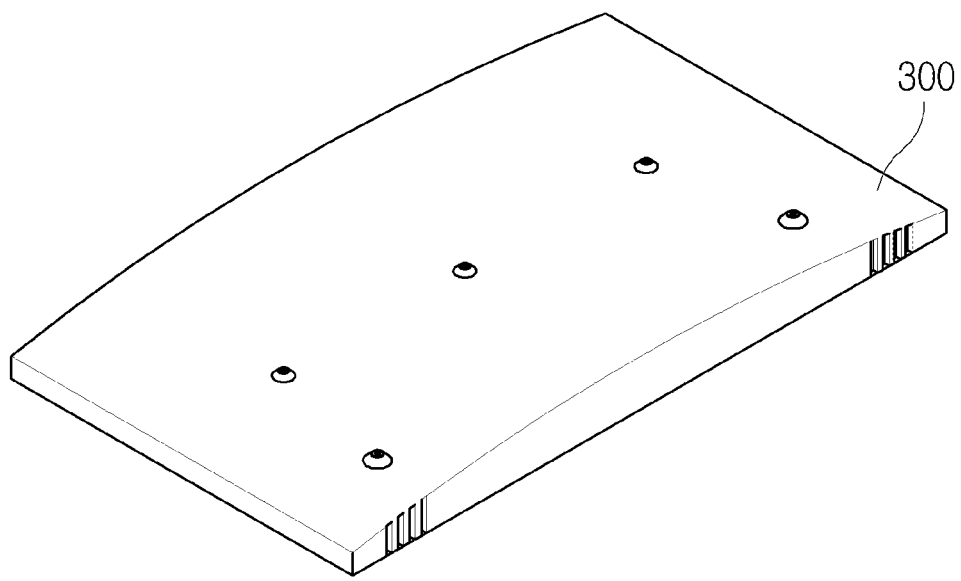

In addition, as shown in FIG. 6D, a rear cover 300 covering the rear and side surfaces of the cover bottom 100 is combined. The rear cover 300 forms a rear and side appearance of the display device.

However, according to another embodiment, the rear cover 300 can be omitted. In this case, the cover bottom 100 and the bracket 200 form the rear appearance of the display device. For example, when the display device is embedded in a wall or a vehicle, or when the display device is a part of a portable device, the rear cover 300 can be omitted or replaced with another configuration.

In addition, according to another embodiment, a sheet can be provided between the circuit board 110 and the bracket 200. The sheet has a size and shape covering all of the circuit board 110 and can be formed of PET material having excellent durability and insulation. The sheet of PET material has a stable electrostatic property because the conductive polymer material is uniformly coated. Therefore, when the sheet is provided, it is possible to maximize an effect of preventing damage to products due to static electricity.

In the foregoing, embodiments of the present disclosure have been described with reference to the accompanying drawings, but it will be understood that the technical configuration of the present disclosure can be practiced in other specific forms without changing the technical spirit or essential features of the present disclosure by those skilled in the art to which the present disclosure pertains. Therefore, the above-described embodiments are to be understood in all respects as illustrative and not restrictive. In addition, the scope of the present disclosure is indicated by the following claims rather than the detailed description. In addition, all modifications or variations derived from the meaning and scope of the claims and their equivalent concepts should be construed as being included in the scope of the present disclosure.

What is claimed is:

1. A display device, comprising:
 a cover bottom in which a liquid crystal panel configured to display an image and a backlight unit configured to provide light to the liquid crystal panel are housed;
 a circuit board mounted on a rear surface of the cover bottom;
 a film electrically connecting the liquid crystal panel and the circuit board and having electronic component mounted thereon;
 a foam gasket assembly including a conductive fabric and a conductive metal member, the conductive fabric being attached to a side surface of the cover bottom to cover the film, and the conductive metal member having one side attached to the conductive fabric and another side attached to the cover bottom; and
 a bracket coupled to a rear surface of the cover bottom to cover the circuit board,
 wherein the conductive metal member includes a plurality of conductive metal members provided to be spaced apart along a longitudinal direction of the conductive fabric.

2. The display device of claim 1, wherein static electricity generated in the display device is energized to the cover bottom through the foam gasket assembly.

3. The display device of claim 2, wherein the cover bottom includes:
 a side frame provided on a side surface of the backlight unit to support the liquid crystal panel, and
 a bottom frame on which the backlight unit is seated.

4. The display device of claim 3, wherein the film is bent along an outer surface of the side frame of the cover bottom.

5. The display device of claim 2, further comprising:
 a driver integrated circuit (IC) configured to drive the liquid crystal panel,
 wherein the driver IC is mounted on the film.

6. The display device of claim 1, wherein the another side of the plurality of conductive metal members is spaced apart from the circuit board.

7. The display device of claim 2, wherein the one side of the plurality of conductive metal members is interposed between the foam gasket assembly and the film.

8. The display device of claim 2, wherein a conductive adhesive layer is applied to one surface of the conductive fabric.

9. The display device of claim 2, wherein the conductive fabric is formed by sequentially plating or coating nickel (Ni), copper (Cu), gold (Au), and anti-pollution urethane (ATU) on a polyester fabric.

10. The display device of claim 1, further comprising:
 a rear cover having the cover bottom and the bracket housed therein.

11. The display device of claim 1, wherein the conductive fabric and the plurality of conductive metal members are integrally formed.

12. A display device, comprising:
 a cover bottom in which a liquid crystal panel configured to display an image and a backlight unit configured to provide light to the liquid crystal panel are housed;
 a circuit board mounted on a rear surface of the cover bottom;
 a film electrically connecting the liquid crystal panel and the circuit board and having electronic component mounted thereon;
 a foam gasket assembly including a conductive fabric and a conductive metal member, the conductive fabric being attached to a side surface of the cover bottom to cover the film, and the conductive metal member having one side attached to the conductive fabric and another side attached to the cover bottom; and
 a bracket coupled to a rear surface of the cover bottom to cover the circuit board,
 wherein static electricity generated in the display device is energized to the cover bottom through the foam gasket assembly, and
 wherein the conductive fabric is formed by sequentially plating or coating nickel (Ni), copper (Cu), gold (Au), and anti-pollution urethane (ATU) on a polyester fabric.

* * * * *